INVENTOR
EDUARD BAUMANN
BY
Kenyon & Kenyon
ATTORNEYS

Sept. 29, 1970 E. BAUMANN 3,531,774

METHOD AND APPARATUS FOR SELECTIVELY EVALUATING PULSE IMAGES IN SUPERHETERODYNE RIPPLE-CONTROL RCEIVERS

Filed Nov. 4, 1966 3 Sheets-Sheet 2

INVENTOR
EDUARD BAUMANN
BY
Kenyon & Kenyon
ATTORNEYS

INVENTOR
EDUARD BAUMANN
BY
Kenyon & Kenyon
ATTORNEYS

United States Patent Office 3,531,774

Patented Sept. 29, 1970

3,531,774

METHOD AND APPARATUS FOR SELECTIVELY EVALUATING PULSE IMAGES IN SUPERHETERODYNE RIPPLE-CONTROL RECEIVERS

Eduard Baumann, Uster, Switzerland, assignor to Zellweger Ltd., Uster, Switzerland, a corporation of Switzerland Filed Nov. 4, 1966, Ser. No. 592,120
Claims priority, application Switzerland, Nov. 30, 1965, 16,537/65
Int. Cl. H04q 9/00; H03k 5/20
U.S. Cl. 340—164 12 Claims

ABSTRACT OF THE DISCLOSURE

The apparatus is designed to selectively evaluate pulse images in receivers for remote control installations in order to carry out a control command. The apparatus includes a semiconductor element having two conditions. A switch moves the semiconductor element from its initial condition to a second condition while a control element which produces a pulse image corresponding to a control command is used to selectively influence the condition of the semiconductor element. The evaluation circuit either enables a control command to be transmitted or not.

This invention relates to a method and apparatus for selectively evaluating pulse images in superheterodyne ripple-control receivers.

Generally, superheterodyne ripple-control installations have relied on the coding of transmitted control commands to allow a number of different commands to be transmitted. In most cases, the individual coded commands have been characterized by pulse images consisting of pulses and pulse intervals which have been positioned relative to one another as a function of time.

Heretofore, these installations have used a plurality of receivers wherein each receiver has been in a position to evaluate a specific pulse image from the plurality of potential pulse combinations in order to carry out the control command designated by this pulse image. However, these receivers have not been intended to carry out any switching operations on the arrival of other, irrelevant pulse images.

In order to permit a switching operation various methods and apparatus have been proposed. One of these proposals has been to reproduce the pulse images to be received by one or more cam wheels which, on the arrival of the correct pulse image, prepare the switching operations to be expected either mechanically or electromechanically, but which prevent such preparation on the arrival of any other pulse image. Unfortunately, methods such as these and the apparatus in which they are carried out require a multiplicity of elements and critical adjustments. In addition, it is necessary in such cases to neutralize any disturbances occurring during completion of the pulse images to be transmitted by means of suitable interlocking devices.

Accordingly, it is an object of the invention to provide a method and apparatus for selectively evaluating pulse images in a superheterodyne ripple-control receiver to carry out a control command.

It is another object of the invention to provide a simple apparatus with a minimum number of elements for selectively evaluating received pulse images in a superheterodyne ripple-control receiver.

It is another object of the invention to avoid the use of interlocking devices in superheterodyne ripple-control receivers.

Briefly, the invention provides a method of selectively evaluating pulse images in superheterodyne ripple-control receivers, for example, as are used in remote control systems of electrical power supply installations. Such ripple-control receivers respond to a sequence of audio frequency electric pulses superimposed to the 50 (or 60) cycles network voltage by a transmitter located at a remote place, e.g., a central power station. These audio frequency pulses are disseminated in the whole power supply network and may therefore be received at remote places of the network. A device for the reception and evaluation of such sequences of audio frequency pulses on the network voltage converts commands that are expressed by such sequences of audio frequency pulses into switching operations. The command or information concerning a specific switching operation is contained in the specific structure in the sequence of audio frequency pulses. Such a structure of this sequence is often called a "pulse image." With this invention, at the beginning of reception of a pulse image, at least one circuit element is moved into a position different from its previous position, which is retained until completion of the pulse image if the pulses or pulse intervals of the received pulse image agree, for at least part of the duration of each pulse or pulse interval, with a pulse image which is produced in the receiver itself after the beginning of reception and which characterizes a control command, but which it loses irrevocably until the end of the pulse image if the pulses or pulse intervals of the received pulse image do not agree at least once for at least part of the duration of each pulse or pulse interval, with a pulse image which is produced in the receiver itself after the beginning of reception and which characterizes a control command, the condition of the circuit element immediately after completion of the pulse image being used as criterion for carrying out the control command.

The invention also relates to an apparatus for carrying out this method, comprising a circuit element with at least one condition differing from its previous condition after the beginning of transmission, a switch for changing the previous condition for the first time, and a control element, corresponding to the pulse image to be received, for opening and closing circuits, as well as means for assessing the condition of the said circuit element at the end of the received pulse image.

These and other objects and advantages of the invention will become more apparent from the following detailed description and appended claims taken in conjunction with the accompanying drawings in which:

FIG. 1 graphically illustrates a pulse image as a function of time;

Figures 1, 2:
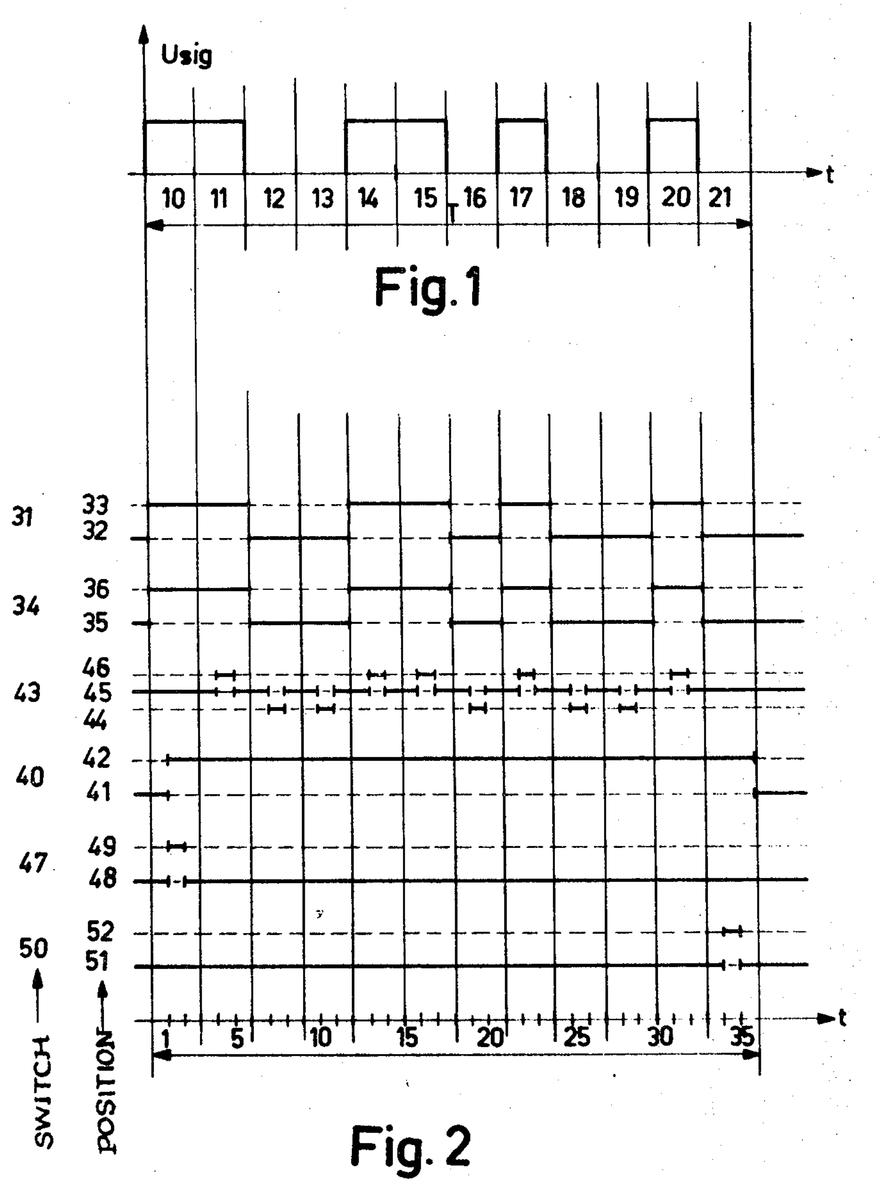
FIG. 2 illustrates a contact plan for a switching arrangement of the invention as a function of time during reception of the pulse image of FIG. 1.

Referring to FIG. 1, a time interval T which is available to each pulse image, is divided up for example into twelve equal intervals. The initial interval 10 represents an interval for the pilot pulse, the intervals 11 to 20 represent the pulse positions required for coding a number of control commands, and interval 21 represents an interval during which the coded command is carried out. The pilot pulse is present with every pulse image to ensure that all the receivers connected to one power supply system start in synchronism and begin evaluating the following pulse image.

The pulse positions for coding are not limited to ten in number but may be of any number. For example, where there are $n$ pulse positions, the maximum number of control commands S which can be transmitted is $$S=2^n$$

To increase reliability of transmission, only those pulse images which contain only a predetermined number $p$ of $n$ pulse positions, can be used. Accordingly, the number of control commands which can be transmitted is $$S_p=\frac{n!}{p!(n-p)!}$$

As far as the selected example of ten pulse positions is concerned, the maximum number of control commands which can be transmitted is $$S_{10}=2^{10}=1024$$

or, where only those pulse images in which five pulse positions are occupied by pulses, are evaluated:

$$S_{10/5}=\frac{10!}{5!.5!}=252$$

Therefore, in order to transmit a control command according to the invention, a pulse image, for example, of a kind which is sent out by a transmitter of a superheterodyne ripple-control installation separated from the mains of the installation by elements (not shown) and reproduced as an image, for example, by a supposed relay, to clearly identify the control command, is superimposed upon a power supply system from a control station (not shown) and reaches all the receivers connected to the power supply system. The control pulses are subsequently separated from the power current and the control pulses superimposed upon the mains are filtered out by receiver circuits which are known per se and are thus given no further explanation in the following description. It is merely emphasized that each pulse is accompanied, for example, by the attraction of a relay 30 (FIG. 3) which reverses its contacts associated with the evaluation circuit discussed in the following.

Figure 3:
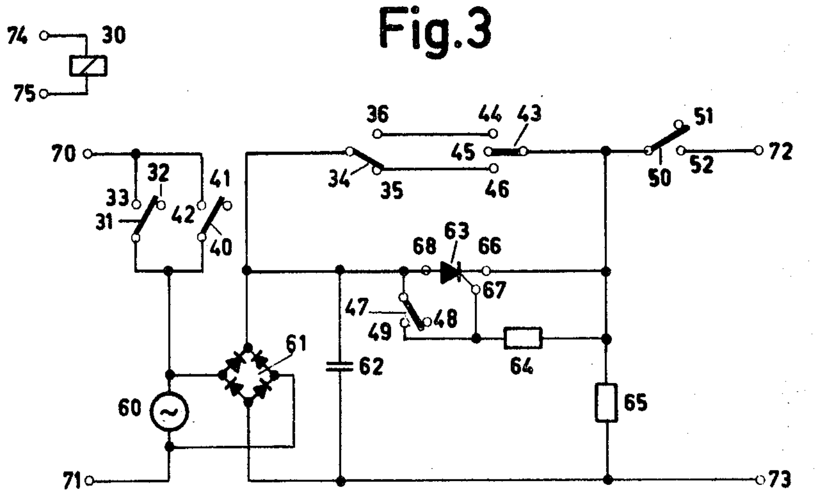
FIG. 3 illustrates an evaluation circuit using the contact plan of FIG. 2 for identifying the pulse image of FIG. 1.

Referring to FIG. 3, an evaluation circuit of the invention comprises terminals 70, 71 which connect the circuit to the mains of the installation, a switch 31 which is closed by the receiving relay 30 during arrival of each transmitted control pulse (positions 33), a synchronous motor 60 which is started up through the switch 31 on arrival of the first control pulse, and a reversing or change-over switch 34 connected to the motor 60 which is displaced from position 35 into the position 36 upon energizing of the receiving relay 30 during arrival of each transmitted control pulse. In addition, the evaluation circuit includes a holding switch 40 which closes just after start-up of the synchronous motor 60 (position 42) and does not open again until the entire pulse image is at an end (time $t=36$, FIG. 2), a rectifier 61 which rectifies the mains voltage applied to the synchronous motor, a filter capacitor 62 for smoothing the rectified A.C. voltage, a semiconductor element 63 which anode 68, cathode 66 and control electrode 67, and a switch 47 which closes briefly at the beginning of the pulse image (position 49), for firing the semiconductor element 63. The semiconductor element 63 is selected for its ability to hold the D.C. voltage supplied by the rectifier 61 in the absence of a control voltage (switch 47 open, position 48) without firing. Also, resistances 64 and 65 are placed in the evaluation circuit so that when the switch 47 is closed and the semiconductor element 63 is non-conductive, a current flows through 64, 65. The resulting fall in voltage across 64 lies between the cathode 66 and the control electrode 67 of the semiconductor element 63 to thus fire the semiconductor 63.

A pulse-monitoring contact reversing or change-over switch 43 controlled by the synchronous motor 60 in accordance with that pulse image for whose reception and evaluation the receiver is provided in series with switch 34 in a circuit connected in parallel with the semiconductor element 63. In the example illustrated, the circuit chosen is such that agreement of the received pulse image, which governs the operations of the switch 34, with the operations of the switch 43 controlled by the synchronous motor, is never accompanied by the development of a connection which would short-circuit the semiconductor element 63, so that the semiconductor element remains conductive to the end of the pulse image. In addition, a sampler switch 50 is provided to make an output 72, 73 live at the end of the pulse image, providing the semiconductor element 63 is still conductive at this stage, and thus pass on the control command to a member (not shown) which carries out the command, for example, a trigger relay.

Once actuated, the synchronous motor 60 takes over the actuation of the switches 40, 43 47 and 50 in correspondence to the pulse image intended to be received. Also, the resistance 65 is so dimensioned that when the switch 47 is open (position 48), the connection between the switches 34 and 43 opens (i.e. 35, 45 or 35, 44, or 36, 45 or 36, 46) and the switch 50 opens (position 51). However, the current whicht flows through the semiconductor element 63 after firing is at least sufficient to keep the element fired.

Referring to FIGS. 2 and 3, the operation of the evaluation circuit upon receiving a control command as in FIG. 1 is as follows:

At time $t=0$, the switch 31 closes (position 33) so that the synchronous motor 60 is started up, the rectifier 61 receives voltage and the switches 34, 47 and the anode 68 of the semiconductor element 63 are made live. Because it is associated with the relay 30, the switch 34 changes to the positions 36; however, this does not have any consequences as the switch 43 is in the intermediate position 45.

At time $t=1$, the holding switch 40 moves from position 41 to position 42 and remains there until time $t=36$. This ensures the complete run-through of the synchronous motor during a time interval T; the further operations of the switch 31 being of no significance to the subsequent cycle.

Also at time $t=1$, the switch 47 moves from position 48 to position 49 with the result that a current flows through the resistances 64 and 65. The resulting fall in voltage across the resistance 64 fires the semiconductor element 63 to cause a current governed by the resistance 65 to flow through the semiconductor element 63.

At time $t=2$, the switch 47 opens (position 48) and remains open. The semiconductor element continues "burning" in spite of this, but cannot fire any more should it be extinguished in the further course of the pulse image.

The first control pulse ends at time $t=3$, completing the starting phase, i.e. interval 10. However, since a pulse is also present in the supposed pulse image during interval 11, both overlap into one another so that nothing further happens at time $t=3$.

At time $t=4$, the switch 43 moves from position 45 to position 46. However, since the switch 34 is in position 36, a current path, which would short-circuit the semiconductor element cannot be developed between 34 and 43. The semiconductor element therefore remains conductive so that the switchover of switch 43 does not have any consequences.

At time $t=5$, the switch 43 returns to neutral position 45. The pulse transmitted during interval 11 ends at time $t=6$. Since it is not followed by a pulse during interval 12, the switch 34 returns to position 35.

At time $t=7$, the switch 43 moves into position 44. However, since the switch 34 is in position 35, a current path, which would short-circuit the semiconductor element, cannot be developed between 34 and 43. The semiconductor element therefore holds its current, so that this switchover does not have any consequences either.

At time $t=8$, the switch 43 returns to its neutral position.

It is easy to see that similar operations are completed in the following intervals 13–20, and that on reception of the supposed pulse image, the switches 34 and 43 avoid contact so that it is impossible for a current path which would short-circuit the semiconductor element to be developed. The semiconductor element 63 therefore remains fired with the result that during the interval 21, the D.C. voltage provided by the rectifier passes through the sampler switch 50 on to the element to be connected to the terminals 72, 73, which carries out the command because its contact is closed between $t=34$ and $t=35$ (position 52).

If, however, a control pulse is transmitted in place of a gap during only one of the intervals 11–20, or, conversely, if a gap appears in place of a control pulse, the short-circuit path referred to above is developed temporarily through the semiconductor element. As a result, the semiconductor element 63 is deprived of current and is extinguished. Since the switch 47 is open (position 48) and since the semiconductor element 63 has the ability to hold the entire voltage supplied by the rectifier when extinguished without firing, it remains extinguished for the rest of the time T. Thus, when the switch 50 closes (position 52) at time $t=34$, no voltage is developed across the terminals 72, 73 so that no command is carried out.

Figure 4:
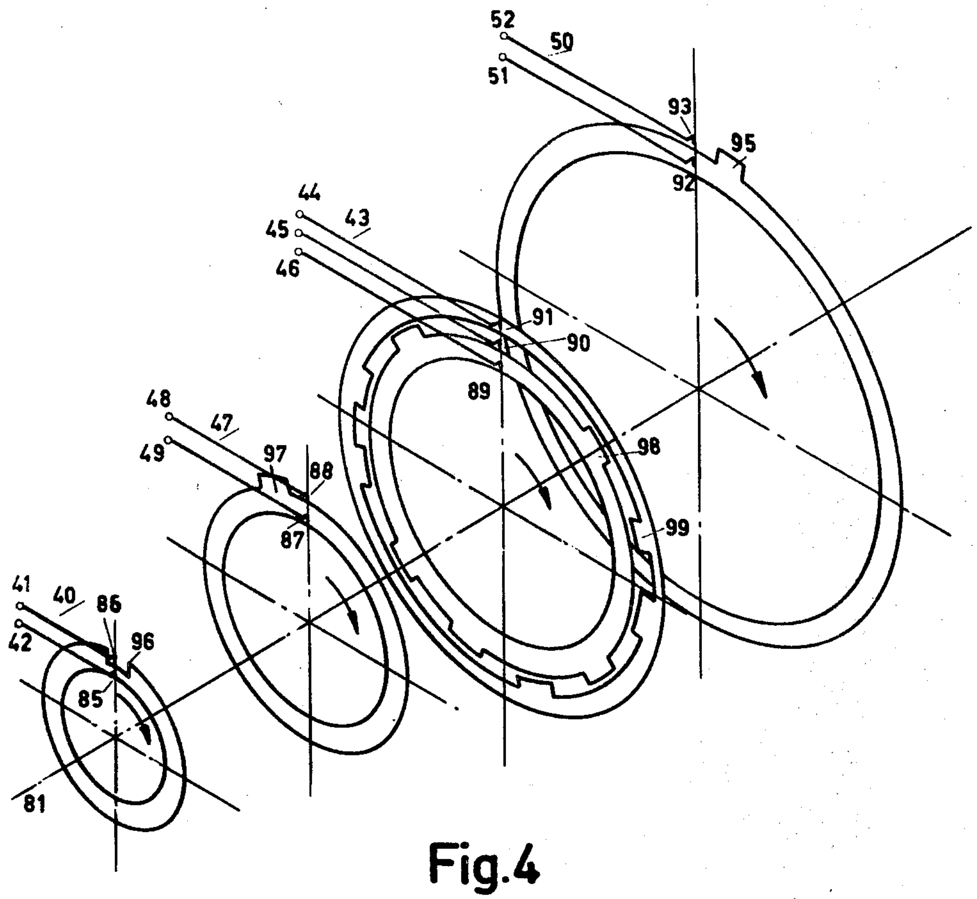
FIG. 4 illustrates an exploded view of a number of contact sets or banks with collector rings which act as switches and reversing switches for the invention.

Referring to FIG. 4, the switches 40, 43, 47 and 50 actuated by the synchronous motor 60 are each in the form of slip-ring contacts since they are active once during the transmission of a pulse image. Since the slip-rings may be in the form of concentric rings on a disc, as described further below, the diameter of the rings increases from the front towards the rear. The order in which the slip-rings and their contacts are arranged is not significant. Nevertheless, those slip-rings which control a simple switching program, are advantageously provided with smaller diameters, whilst those which control a switching program differing widely as a function of time, are provided with larger diameters. As shown, the switches 40, 47, 43 and 50 follow one another from the left to right.

The switch 40 with the contacts 41, 42 forms the self-holding contact for the synchronous motor 60 and is in the form of a conductor ring which is wide enough to "cover" both contact points 85, 86 with the exception of a gap 96 in which a segment is insulated to thus establish the start-up position for the motor 60. Immediately after the motor has been started up, the insulator 96 leaves the contact position 86 whilst the conductor ring takes over the function of the relay contact 31, 33.

The switch 47 with the connections 48, 49 is formed by the second slip-ring and is only wide enough to carry one contact point 87, the other contact position 88 lying on insulating material with the exception of a tooth 97. The tooth 97 is oriented relative to the starting position in such a way to connect the contact positions 88 and 87 during the time interval 10 between $t=1$ and $t=2$. This corresponds to the brief closure of the contact 47–49 to fire the semiconductor element 63.

The fourth slip-ring with the connections 51, 52, the contact points 92, 93 and the lug 95, acts in the same way. During the time interval 21 ($t=34$ to $t=35$), the lug 95 approaches the contact points 92, 93 and, in so doing, establishes the voltage condition across the terminals 52, 51.

The actual element which codes a predetermined command is formed by a pair of slip-rings which have a transfer contact 43 with three connections 44, 45, 46 and three contact points 89, 90 and 91. Each of the contact points 89 and 91 travels on a closed conductor circuit. Teeth 98 and 99 project from the inner conductor circuit and the outer conductor circuit, respectively, into the area around the contact point 90, depending upon the pulse image to be monitored as the coded control command. After these slip-rings have completed one revolution, the connection 45 is connected either with the connection 44 or the connection 46 during part of the intervals 11 to 20 in the same way as described with reference to FIG. 3. Accordingly, there is a connection between 43 and 46 at times $t=4$ to $t=5$
$t=13$ to $t=14$
$t=16$ to $t=17$
$t=22$ to $t=23$
$t=31$ to $t=32$ whilst a connection is developed between 43 and 44 at the times $t=7$ to $t=8$
$t=10$ to $t=11$
$t=19$ to $t=20$
$t=25$ to $t=26$
$t=28$ to $t=29$ This corresponds to the operation of the switch 43. Each slip-ring carries a tooth at the position corresponding to the interval time, which is connected either with the inner or with the outer full track 89 or 91, depending on whether the pulse image to be received is intended to contain a pulse or a gap in one of the intervals 11 to 20.

It would of course even be possible for the arrangement to be such that a continuous conductor circuit is present in the region of the contact points 90, with the teeth 98, 99 projecting inwards from this conductor circuit towards the contact point 89, or outwards towards the contact point 91.

Figure 5:
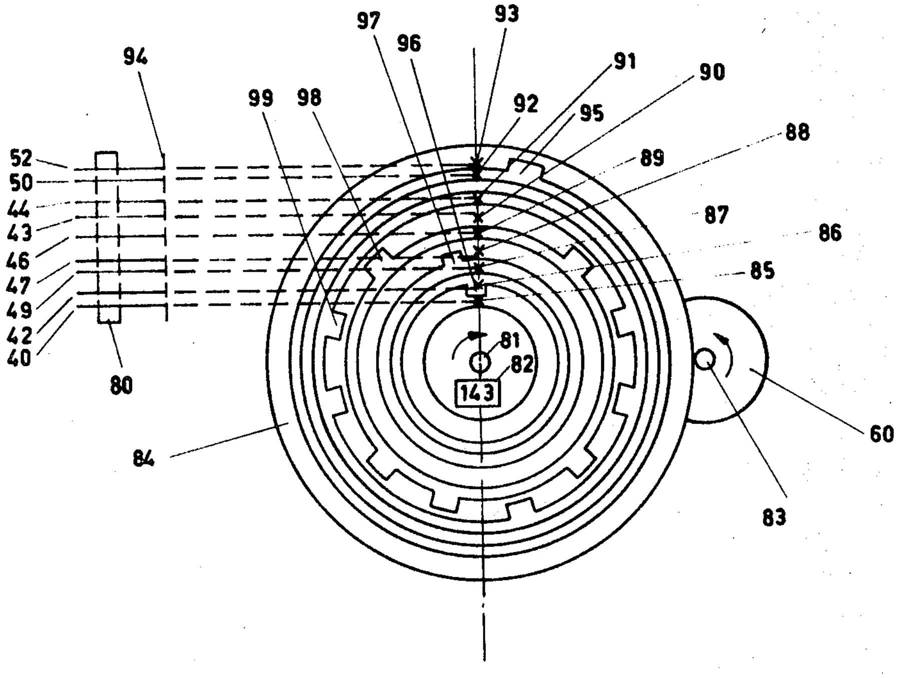
FIG. 5 illustrates a modified embodiment of a switching disc with drive and contact banks.

Referring to FIG. 5, one particularly advantageous embodiment of the switches 40, 43, 47 and 50 is in the form of a disc 84 of insulating material which carries a number of conductive slip tracks. In order to simplify the illustration, these slip tracks are shown arranged on the front side in FIG. 5. As far as the rest of the following description is concerned, however, they are assumed to lie on the underneath of the disc which is concealed from the viewer in FIG. 5.

The disc 84 is produced on the lines of a printed circuit, which can be done with sufficient precision and solidity for the intended purpose. The disc is mounted for rotation on the spindle 81 in a manner to be readily placed or removed manually. This is of particular importance insofar as the disc represents the pulse image and hence the control command to which the receiver equipped with it is receptive. For adjustment to another control command, the disc must therefore be replaced by another disc. In the selected arrangement, this can be done very easily without tools by semi-skilled personnel at the receiver assembly shop.

Provided beneath the disc is the contact bank 80. The terminal points 94 of the contacts 52, 50, 44, 43, 46, 47, 49, 42 and 40 touch the contact tracks or paths at the contact positions 85 to 93 marked $x$.

The disc 84 is provided around the periphery with teeth which mesh directly with the pinion 83 of the synchronous motor 60. It would of course even be possible for the drive system to be differently designed, for example, by connecting one or more gear stages between the synchronous motor 60 and the disc 84, or by having the spindle of driven instead of the disc 84, in which case an anti-torsion means would have to be provided between the disc 84 and the spindle 81.

It is clear that the disc 84 with its contact paths, carries the entire operation plan of the evaluation circuit which has been described here by way of example. It ensures that the evaluation circuit only passes on a received pulse image to the performing member if this pulse image agrees with the pulse image recorded on it. Any other pulse images received which do not agree, remain without effect.

For this reason, the disc can be provided with a reference number 82 characterizing the control command to be received. This can be determined from the pulse image or, conversely, the number can be determined from the pulse image after adjustment of the combination, for example, by designating the pulses A and the intervals B, and by giving the letter A precedence over B. It is emphasized in particular that the sequence of the switching functions themselves and the relationships between the individual switching functions, are determined as a function of time by the disc 84, with the result that there is no need whatever for adjustments in this direction. The only requirement in this connection is that the ends of the contacts of the contact bank 80 should contact the disk 84 along the definite path.

The fact that the relationship in time are governed by the disc is also expressed inter alia in the ability of the disc 84 to be placed in any distorted position on the spindle 81, because the synchronous motor immediately returns the disc to the correct position after having been made live without, at the same time, carrying out an order because either the semiconductor element 63 is not conductive, or the correct program is not received.

The example of an evaluation circuit which has been discussed herein enables a control command to be transmitted. It would of course even be possible to provide several similar tracks or paths on the disc for evaluating different, additional pulse images, in which case the contact bank 80 and the circuit shown in FIG. 3 would have to be enlarged accordingly.

In the example described herein, the pulse-monitoring switch 43 differs from the switch 34 reproducing the transmitted pulse image. Providing the circuit is suitably designed, agreement of the switches 34 and 43 which is either permanent or can be obtained for at least part of the duration of each interval 10–20, can be used as criterion for the reception of the correct pulse image.

What is claimed is:

1. An apparatus for selectively evaluating pulse images in a receiver for mains-superposition remote control installations comprising an electrical circuit in the receiver for receiving a first pulse image including a semiconductor element having an initial condition and a second condition, a first switch for changing said semiconductor element from said initial condition to said second condition, a control element producing a second pulse image in the receiver corresponding to a control command having means for opening and closing circuits to compare said first and second pulse images to selectively influence the condition of said semiconductor element in one of said conditions, and means for assessing the condition of said semiconductor element at the conclusion of reception of said first pulse image.

2. An apparatus as set forth in claim 1 further comprising a motor and two change-over switches, the first of said switches being operated by the received pulses in accordance with said first pulse image, the second of said switches being connected to said motor for operation thereby to carry out switching operations according to said second pulse images.

3. An apparatus as set forth in claim 2 wherein said second change-over switch has a neutral center position.

4. An apparatus as set forth in claim 2 wherein said change-over switches are incorporated in a circuit connected in parallel with said semiconductor element.

5. An apparatus as set forth in claim 1 wherein said means for assessing the condition of said semiconductor element is a sampler switch having a pair of positions whereby upon movement of said sampler switch from one position to the other position at completion of said first pulse image said sampler switch passes said control command with said semiconductor element in said second condition and does not pass said control command with said semiconductor element in said first condition.

6. An apparatus as set forth in claim 5 which further comprises a common motor for actuating said first switch, said change-over switches, and said sampler switch.

7. An apparatus as set forth in claim 6 further comprising a holding switch connected to said motor for maintaining operation of said motor during reception of said first pulse image in the receiver.

8. An apparatus as set forth in claim 7 wherein said control element includes a switching disc having contact paths and a contact bank cooperating with said contact paths representing said first switch, said second change-over swtich, said holding switch and said sampler switch.

9. An apparatus as set forth in claim 8 wherein said switching disc is in the form of a printed circuit.

10. An apparatus as set forth in claim 8 wherein said switching disc has a predetermined arrangement of teeth associated with said second pulse image whereby said disc is interchangeable with other discs having arrangements of teeth associated with other pulse images.

11. An apparatus as set forth in claim 10 wherein said switching disc is marked with a number characteristic of a pulse sequence.

12. An apparatus as set forth in claim 8 wherein the periphery of said switching disc is in the form of a gear ring, and said motor includes a pinion meshing with said periphery.

References Cited

UNITED STATES PATENTS

| | | | |
|---|---|---|---|
| 2,794,969 | 6/1957 | Barnhart. | |
| 3,026,799 | 3/1962 | Toomey | 317—134 XR |
| 3,058,095 | 10/1962 | Reynolds. | |
| 3,067,405 | 12/1962 | Hurlimann et al. | 340—164 |

DONALD J. YUSKO, Primary Examiner

U.S. Cl. X.R.

340—167

PO-1050
(5/69)

UNITED STATES PATENT OFFICE
CERTIFICATE OF CORRECTION

Patent No. 3,531,774 Dated September 29, 1970

Inventor(s) Eduard Baumann

It is certified that error appears in the above-identified patent and that said Letters Patent are hereby corrected as shown below:

Column 6, line 65, "spindle of driven" should be ---spindle 81 driven---

Column 7, line 15, "disk" should be ---disc---

SIGNED AND SEALED
DEC 22 1970

(SEAL)
Attest:

Edward M. Fletcher, Jr.
Attesting Officer

WILLIAM E. SCHUYLER, JR.
Commissioner of Patents